(No Model.)

O. LINDNER.
PNEUMATIC TIRE FOR WHEELS.

No. 474,453. Patented May 10, 1892.

Witnesses:

Inventor.
Otto Lindner

UNITED STATES PATENT OFFICE.

OTTO LINDNER, OF BRUSSELS, BELGIUM.

PNEUMATIC TIRE FOR WHEELS.

SPECIFICATION forming part of Letters Patent No. 474,453, dated May 10, 1892.

Application filed April 13, 1891. Serial No. 388,807. (No model.) Patented in Belgium December 15, 1890, No. 93,099; in England December 31, 1890, No. 21,253, and in France January 8, 1891, No. 210,657.

*To all whom it may concern:*

Be it known that I, OTTO LINDNER, engineer, of Brussels, Belgium, have invented a new Elastic Bandage or Tire for Velocipede and other Wheels, (for which I have obtained a patent in Belgium, No.93,099, dated December 15, 1890; in France No. 210,657, dated January 8, 1891, and in Great Britain, No. 21,253, dated December 31, 1890,) of which the following is a specification.

My invention relates more particularly to elastic bandages (hollow and inflatable) such as are useful for velocipede and invalid-chair wheels.

The object of my invention is to construct an elastic bandage (or tire) which, without the use of machinery, (or any adhesive matter,) can be very easily fastened and unfastened to the metal tire, and which elastic bandage (or tire) by its special form prevents itself from being deteriorated by the metal tire on which it is secured. I obtain this object in combining the different parts of the bandage by means of a wire, band, or other suitable material and in the manner as shown in the accompanying drawings, in which—

Figure 1:
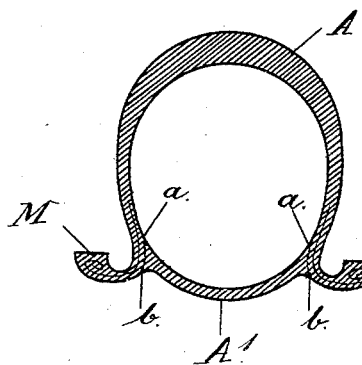
Figure 2:
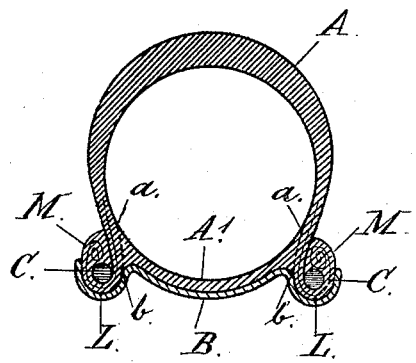
Figure 3:
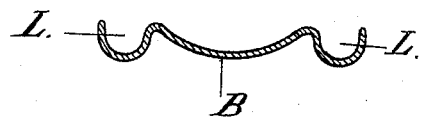
Figure 4:
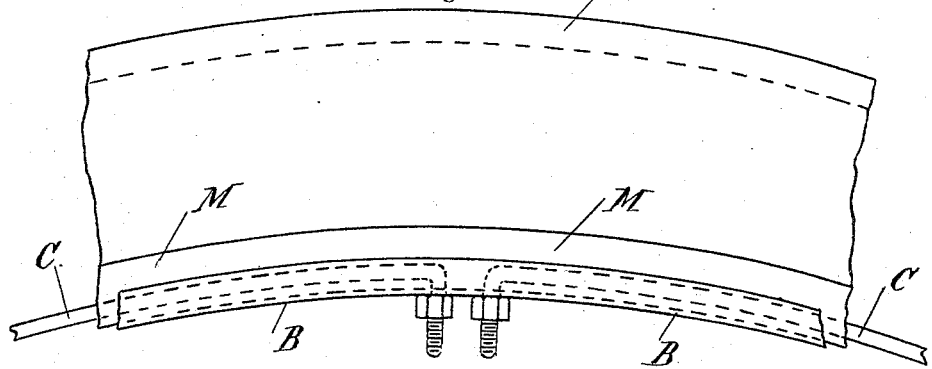

Figure 1 represents a cross-section of the elastic bandage (or tire) A, provided with its projecting special lips, edges, or seams M M. Fig. 2 shows the bandage (or tire) A secured with its projecting lips or seams M M into the grooves L L of the metal tire B by a wire C. Fig. 3 is the metal tire B with its two grooves L L, one on each side on its outer periphery. Fig. 4 shows one of the many ways in which the two ends of the wire, band, or other suitable material may be fastened.

The elastic bandage (or tire) A may be molded closed as an endless tube, so as to serve for an inflatable bandage or tire of one single tube, or be molded in leaving out the portion A' (indicated by lines *a* and *b*) in Fig. 1, and then be used as an outer cover of an air-cushioned bandage or tire only; but of course in both cases its principal features, the lips or seams M M, are not to be altered.

After having placed the elastic tire A on the metal tire B and when drawing the wire C (or other fixing material) over the lips or seams M M and thereby pressing these into the grooves L L the outer edges of the lips or seams M M will naturally fold over the binding material C toward the sides of the elastic bandage (or tire) A, as shown in Fig. 2, and in this position these lips or seams M M will prevent the sides of the elastic bandage (or tire) A from coming into contact with the edges of the metal tire B, and consequently avoid deterioration of the elastic bandage (or tire) A.

I am aware that prior to my invention elastic (rubber) tires have been attached with wires or other like material to wheel-tires in different ways, and therefore I do not claim such combination, broadly; but never to my knowledge have wires or such like binding material been used to be placed on special-shaped lips or seams of a hollow elastic bandage (or tire) in order to draw such lips or seams into grooves, one on each side of a metal tire, and that such lips or seams of the said elastic bandage, (or tire,) besides serving to secure the elastic bandage to the metal tire, also serve as a guard against deterioration, as above described.

Therefore I claim as my invention and wish to secure by Letters Patent—

In elastic bandages (or tires) and their respective supporting metal tires (or rims) for velocipede and invalid-chair wheels, the combination of an elastic (inflatable) bandage (or tire) A, (to be used as such or as an outer covering of such only,) bearing on its lower part on both its circumferential sides special-shaped lips or seams M M, which are drawn and kept into the grooves L L of the metal tire B by a wire, band, or other suitable material C, whereby the elastic bandage (or tire) A is secured to the metal tire B, and the special lips or seams M M in such secured position form a guard against the deterioration of the elastic bandage (or tire) A, all substantially as and for the purpose described.

Brussels, February 27, 1891.

OTTO LINDNER.

Witnesses:
 ROWLEY BENTON TURNER,
 GREGORY PHELAN.